US008806537B2

(12) United States Patent
Koch (10) Patent No.: US 8,806,537 B2
(45) Date of Patent: Aug. 12, 2014

(54) METHODS, SYSTEMS, AND COMPUTER PROGRAM PRODUCTS FOR IMPLEMENTING INTERACTIVE CONTROL OF RADIO AND OTHER MEDIA

(75) Inventor: Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1526 days.

(21) Appl. No.: 11/523,955

(22) Filed: Sep. 20, 2006

(65) Prior Publication Data

US 2007/0016922 A1 Jan. 18, 2007

Related U.S. Application Data

(63) Continuation-in-part of application No. 10/958,813, filed on Oct. 5, 2004, now abandoned.

(51) Int. Cl.
*H04N 5/445* (2011.01)
*G06F 3/00* (2006.01)
*G06F 3/13* (2006.01)
*H04N 21/462* (2011.01)
*H04N 21/472* (2011.01)
*H04N 21/4722* (2011.01)
*H04N 21/858* (2011.01)

(52) U.S. Cl.
CPC ......... *H04N 21/462* (2013.01); *H04N 21/4622* (2013.01); *H04N 21/472* (2013.01); *H04N 21/4722* (2013.01); *H04N 21/858* (2013.01); *H04N 21/8586* (2013.01)
USPC .................................. 725/51; 725/39; 725/47

(58) Field of Classification Search
CPC ............ H04N 21/8586; H04N 21/462; H04N 21/4622; H04N 21/472; H04N 21/4722
See application file for complete search history.

(56) References Cited

U.S. PATENT DOCUMENTS

| | | | |
|---|---|---|---|
| 5,488,409 A | 1/1996 | Yuen et al. | |
| 5,699,107 A | 12/1997 | Lawler et al. | |
| 6,172,677 B1 * | 1/2001 | Stautner et al. | 715/716 |
| 6,177,931 B1 * | 1/2001 | Alexander et al. | 725/52 |
| 6,317,784 B1 | 11/2001 | Mackintosh et al. | |
| 6,349,329 B1 | 2/2002 | Mackintosh et al. | |
| 6,412,111 B1 | 6/2002 | Cato | |
| 6,601,103 B1 | 7/2003 | Goldschmidt Iki et al. | |
| 6,678,892 B1 | 1/2004 | Lavelle et al. | |
| 6,701,355 B1 | 3/2004 | Brandt et al. | |
| 6,771,290 B1 | 8/2004 | Hoyle | |
| 6,782,550 B1 | 8/2004 | Cao | |
| 6,871,356 B2 | 3/2005 | Chang | |
| 6,904,609 B1 * | 6/2005 | Pietraszak et al. | 725/39 |
| 6,928,654 B2 | 8/2005 | Tranchina et al. | |
| 6,966,037 B2 | 11/2005 | Fredriksson et al. | |
| 6,973,669 B2 | 12/2005 | Daniels | |
| 6,981,045 B1 | 12/2005 | Brooks | |
| 6,996,390 B2 | 2/2006 | Herley et al. | |
| 7,024,676 B1 | 4/2006 | Klopfenstein | |

(Continued)

*Primary Examiner* — Nathan Flynn
*Assistant Examiner* — James R Marandi
(74) *Attorney, Agent, or Firm* — Cantor Colburn LLP (57) ABSTRACT

A method for presenting content to a user through a content management device. The method includes receiving at a content management device content from a plurality of content providers. The content management device generates a supplemental programming data from the content providers. The content management device receives guide programming data from a content-independent programming data source. The content management device generates an interactive program guide in response to the supplemental programming data and the guide programming data, the interactive program guide presenting content available to the user.

17 Claims, 6 Drawing Sheets

(56) References Cited

U.S. PATENT DOCUMENTS

| | | |
|---|---|---|
| 7,028,071 B1 | 4/2006 | Slik |
| 7,095,986 B2 | 8/2006 | Mager |
| 7,120,924 B1 | 10/2006 | Katcher et al. |
| 7,158,753 B2 | 1/2007 | Kagan et al. |
| 7,181,756 B1 | 2/2007 | Zigmond et al. |
| 7,188,186 B1 | 3/2007 | Meyer et al. |
| 7,403,913 B2 | 7/2008 | Wood |
| 7,412,716 B2 | 8/2008 | Kikinis et al. |
| 7,444,353 B1 | 10/2008 | Chen et al. |
| 7,493,645 B1 | 2/2009 | Tranchina |
| 7,493,646 B2 | 2/2009 | Ellis |
| 7,603,683 B2 | 10/2009 | Reto |
| 7,673,315 B1 | 3/2010 | Wong et al. |
| 2001/0034705 A1 | 10/2001 | Rhoades |
| 2002/0013851 A1 | 1/2002 | Crandall |
| 2002/0013950 A1 | 1/2002 | Tomsen |
| 2002/0016971 A1 | 2/2002 | Berezowski et al. |
| 2002/0049037 A1 | 4/2002 | Christensen et al. |
| 2002/0059603 A1* | 5/2002 | Kelts ............................ 725/47 |
| 2002/0059610 A1 | 5/2002 | Ellis |
| 2002/0082879 A1 | 6/2002 | Miller et al. |
| 2002/0104090 A1 | 8/2002 | Stettner |
| 2002/0120925 A1 | 8/2002 | Logan |
| 2002/0120936 A1 | 8/2002 | Del Beccaro et al. |
| 2002/0143645 A1 | 10/2002 | Odinak et al. |
| 2002/0144116 A1 | 10/2002 | Giobbi |
| 2002/0162118 A1 | 10/2002 | Levy et al. |
| 2002/0174430 A1* | 11/2002 | Ellis et al. ...................... 725/46 |
| 2002/0174436 A1 | 11/2002 | Wu et al. |
| 2003/0018748 A1 | 1/2003 | McKenna, Jr. |
| 2003/0020744 A1 | 1/2003 | Ellis et al. |
| 2003/0056219 A1 | 3/2003 | Reichardt et al. |
| 2003/0066076 A1 | 4/2003 | Minahan |
| 2003/0149980 A1 | 8/2003 | Hassell et al. |
| 2003/0149988 A1 | 8/2003 | Ellis et al. |
| 2003/0154481 A1* | 8/2003 | Andersen et al. ............... 725/47 |
| 2003/0159150 A1 | 8/2003 | Chernock et al. |
| 2004/0116088 A1 | 6/2004 | Ellis et al. |
| 2004/0117831 A1 | 6/2004 | Ellis et al. |
| 2004/0117845 A1 | 6/2004 | Karaoguz et al. |
| 2004/0148424 A1 | 7/2004 | Berkson et al. |
| 2004/0153767 A1 | 8/2004 | Dolgonos |
| 2004/0177003 A1 | 9/2004 | Liao et al. |
| 2004/0203630 A1 | 10/2004 | Wang |
| 2004/0226051 A1 | 11/2004 | Carney et al. |
| 2005/0005298 A1 | 1/2005 | Tranchina |
| 2005/0020223 A1 | 1/2005 | Ellis et al. |
| 2005/0028208 A1 | 2/2005 | Ellis et al. |
| 2005/0045373 A1 | 3/2005 | Born |
| 2005/0055730 A1 | 3/2005 | Daniels |
| 2005/0120858 A1 | 6/2005 | Fitzgerald et al. |
| 2005/0203992 A1 | 9/2005 | Tanaka et al. |
| 2005/0204388 A1 | 9/2005 | Knudson et al. |
| 2005/0210181 A1 | 9/2005 | Depke et al. |
| 2005/0239402 A1 | 10/2005 | Gioscia et al. |
| 2005/0251455 A1 | 11/2005 | Boesen |
| 2005/0288999 A1 | 12/2005 | Lerner et al. |
| 2005/0289591 A1 | 12/2005 | Vermola et al. |
| 2006/0008256 A1 | 1/2006 | Khedouri et al. |
| 2006/0112409 A1 | 5/2006 | Yoon |
| 2006/0156346 A1 | 7/2006 | Kulakowski |
| 2006/0184969 A1 | 8/2006 | Yamamoto |
| 2007/0135084 A1* | 6/2007 | Ido et al. ...................... 455/355 |
| 2008/0184301 A1 | 7/2008 | Boylan |

* cited by examiner

METHODS, SYSTEMS, AND COMPUTER PROGRAM PRODUCTS FOR IMPLEMENTING INTERACTIVE CONTROL OF RADIO AND OTHER MEDIA

CROSS-REFERENCE TO RELATED APPLICATIONS

This application is a continuation-in-part application of U.S. non-provisional application Ser. No. 10/958,813, filed Oct. 5, 2004 now abandoned, the contents of which are incorporated by reference herein.

BACKGROUND

Embodiments of the invention relate generally to communications systems, and more particularly, to methods, systems, and computer program products for implementing interactive control of radio and other media.

Continuous advancements made with respect to technologies associated with the electronics industry have resulted in significant improvements in various product features of electronics devices such as personal and desktop computers, DVD players, and stereo systems, to name a few. For example, computer manufacturers now offer increased memory capacity, faster processors, longer battery life, etc. At the same time, electronics manufacturers are continuously striving to reduce the overall size of many of these devices, without sacrificing any of these improved features, in order to satisfy the demand for portability. As with standard or traditional electronics devices, portable electronics devices such as digital music players, personal digital assistants (PDAs) or 'pocket PCs', and the like are becoming increasing popular. Accordingly, electronics manufacturers and various service providers are constantly searching for new ways to provide value to the consumers of these devices in order to gain and maintain a competitive edge over their industry counterparts.

Another area that is experiencing growth in technology is the broadcast industry. The development of new standards in broadcast communications have enabled broadcast enterprises to deliver a variety of information, both related and unrelated to a broadcast, along with the actual broadcast content (e.g., music, audio/video programming, news, etc.). As long as the broadcast-receiving device is enabled with the standard, it can receive, translate, and respond to the delivered information. For example, a display on the receiving device (e.g., car stereo) may present information relating to content (such as a song) that is currently being broadcast such as a station identification of the broadcasting station, the artist name, and the title of the song, to name a few. Additionally, information unrelated to the content being broadcast (such as advertising) may be delivered and presented. While having this additional information may be useful, the technology does not currently support interactive communications between a broadcast recipient and the sources related to the content broadcast. For example, in response to hearing a song broadcast on a recipient's receiving device, the recipient may desire to contact a source to purchase the song (e.g., via download or placing an order with a music provider) at the time of the broadcast or shortly thereafter.

It is desirable, therefore, to provide a means for enabling interactive control of radio and other media.

Exemplary embodiments include methods for presenting content to a user, the method comprising: receiving at a content management device content from a plurality of content providers; receiving at the content management device supplemental programming data from the content providers; receiving at the content management device guide programming data from a content-independent programming data source; generating an interactive program guide in response to the supplemental programming data and the guide programming data, the interactive program guide presenting content available to the user.

Exemplary embodiments further include methods for presenting content to a user, the method comprising: receiving at a content management device content from a plurality of content providers; receiving at the content management device programming data related to the content; generating an interactive program guide in response to the content and the programming data, the interactive program guide presenting content available to the user; wherein if a content identifier of content received from a content provider matches a content identifier of content stored on the content management device, then an indicator indicating that the content is already stored on the content management device is associated with the content in the interactive program guide.

Exemplary embodiments further include content management devices comprising: a content receiver receiving content from a content provider and receiving supplemental programming data from the content provider; a data transceiver receiving guide programming data from a content-independent programming data source; a user interface display controller generating an interactive program guide in response to the supplemental programming data and the guide programming data, the interactive program guide presenting content available to the user; a display device coupled to the user interface display controller for displaying the interactive program guide.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

In accordance with exemplary embodiments, the interactive content-based activities system provides a means by which a recipient of broadcast content (also referred to herein as "broadcast") may initiate a real-time request for an item, service, or information (collectively referred to herein as "activity") that is associated with the broadcast content. Broadcast content may include music, audio/video programming, advertising, news, etc., that is transmitted via, e.g., over-the-air radio frequency (RF) signals, satellite technology, or digitally over a network, to name a few. A unique content identifier is assigned to each broadcast event and is transmitted together with the broadcast event. Using the content identifier, a recipient of the broadcast content may initiate a request for an activity that is related to the broadcast content. The request may be initiated during the broadcast or sometime after the broadcast has completed.

Figure 1:
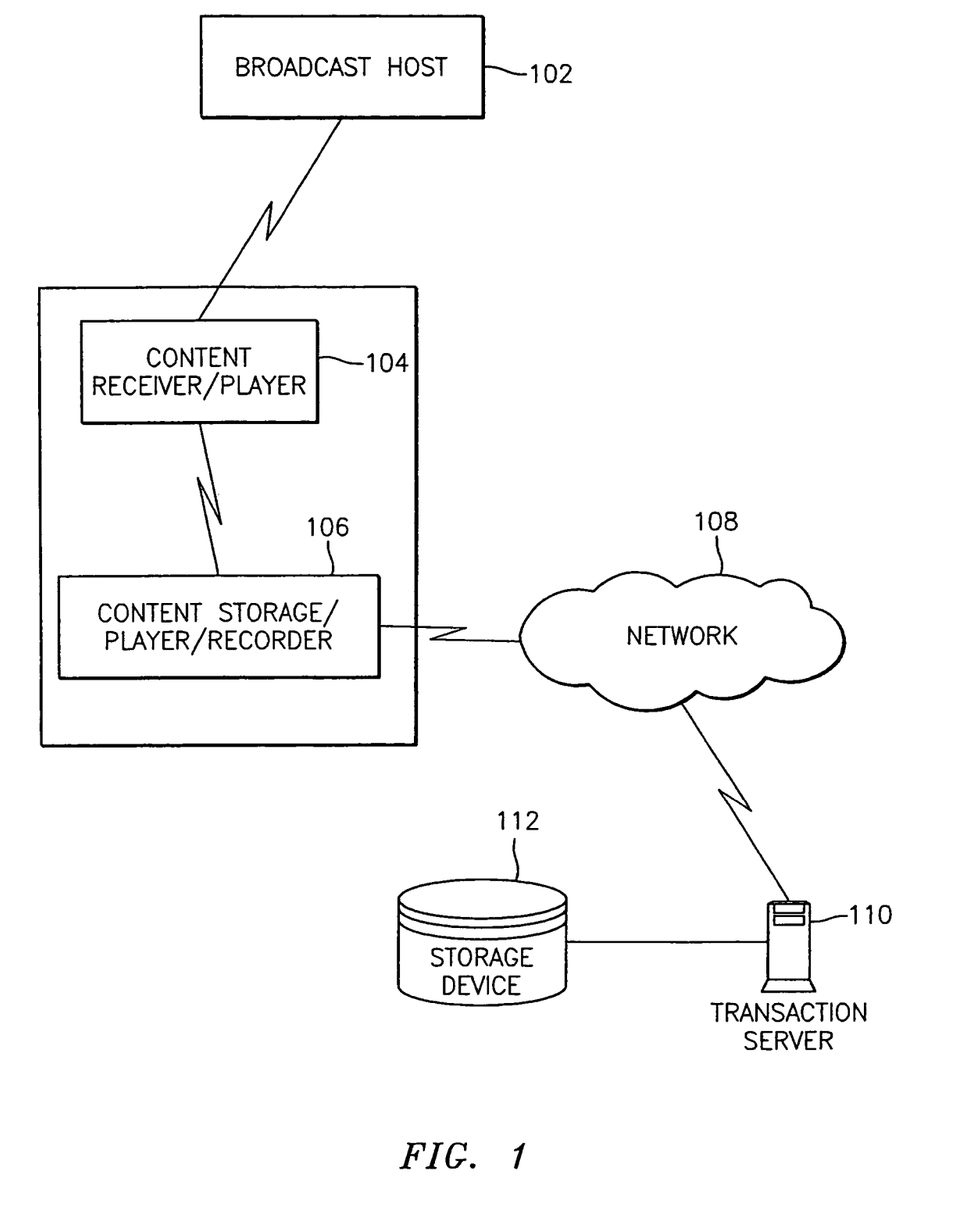
FIG. 1 is a block diagram of a system upon which interactive content-based activities may be implemented in exemplary embodiments.

Referring now to FIG. 1, a block diagram of an exemplary system for implementing interactive content-based activities is generally shown. The exemplary system of FIG. 1 includes a broadcast host system 102 in communication with a content receiver 104. Broadcast host system 102 provides broadcast content (e.g., music, programming, sports, news, advertising, etc.) to content receiver 104 via a transmissions means such as over-the-air radio frequency (RF) signals or a digital network (e.g., broadband digital subscriber line (DSL)). In addition to transmitting content, broadcast host system 102 also transmits supplementary content information in the form of digital encoded signals. The supplementary content information may include for example, the identification of the broadcast host system, the artist/composer/owner of the content, the title of the content, a content identifier that distinguishes the content from other broadcast items, etc. Broadcast host system 102 may be a radio station or Internet radio service provider that transmits audio content, a television or other audio/video content service provider, or other similar type of content provider system. Additionally, the content that is broadcast may comprise any type of media (e.g., video, images, text, etc.).

In accordance with one embodiment, broadcast host system 102 is a broadcast radio station that transmits content via radio frequency (RF) signals. Broadcast host system 102 provides Radio Data System (RDS), Radio Broadcast Data System (RBDS), or similar type of service to its customers. For example, in addition to transmitting traditional content (e.g., music, programming, advertisements), radio stations may transmit supplementary information in the form of encoded digital signals that are received and analyzed by an RDS/RBDS-enabled receiver. RDS/RBDS technology enables a receiver to identify the radio station it is tuned into, offers the ability to pre-select programming types from available stations (e.g., music only content), a broadcast intercept feature that provides traffic advisory information, as well as other capabilities. The RDS and RBDS specifications have been adopted by official standardization bodies such as the European Center for Electrotechnical Standardization (CENELEC) in Europe, as well as the National Radio System Committee (NRSC) of the National Association of Broadcasters® (NAB) and the Electronic Industries Association (EIA) in the United States.

In exemplary embodiments, content receiver 104 receives broadcast signals (e.g., RF, data, satellite) from broadcast host system 102, translates the signals, and presents the resulting content to a broadcast recipient. Content receiver 104 may also receive audio content from other broadcast host systems (e.g., multiple radio stations) within its range. In one embodiment, content receiver 104 is a radio that is built in to an RDS/RBDS-enabled automobile that receives RF signals (e.g., FM) from broadcast host system 102 via a receiver located on the automobile. Alternatively, the automobile described above with respect to the content receiver 104 may employ a global positioning system (GPS) device whereby broadcast content is transmitted to the content receiver 104 via satellite. In other embodiments, content receiver is an RDS/RBDS-enabled home stereo system that receives RF signals from broadcast host system 102. Content receiver 104 converts the signals to audio signals and presents the resulting audio content to a listener as well as the supplementary data facilitated by the RDS/RBDS services. In yet further embodiments, content receiver 104 may be a television or personal computer that receives broadcast content via a network, e.g., digital subscriber line (DSL) or cable services.

In exemplary embodiments, content storage/player 106 includes an intelligent device that stores and plays recorded or downloaded content. Content storage/player 106 may communicate with content receiver 104 via a Universal Serial Bus (USB) cable or via wireless technologies, e.g., Bluetooth™ or short messaging service (SMS). Content storage/player 106 may also include input/output controls or options as well as a user interface for implementing the interactive content-based activities as will be described further herein. It will be understood that the form of user interface may vary from one type of content device to another (e.g., voice prompts and selections via key depressions may be used on a cellular telephone, web page user interface screen for a computer user, etc.); however, in exemplary embodiments the functionality of the user interface remains the same across all content storage/player devices.

Content storage/player 106 may be a portable device that includes digital recording and playback features such as those provided by, e.g., an iPod® player by Apple Computer, Inc® of Cupertino, Calif., or an IAUDIO M3® by Cowon Systems, Inc. of Seoul, Korea. In alternate embodiments, content storage/player 106 may be a web-enabled cellular telephone, personal digital assistant (PDA), a computer, an Internet-enabled television, etc.

Content storage/player 106 may store a variety of content such as digital games, pictures, and personal data (e.g., calendars, organizers, etc.). Content storage/player 106 may play recorded music in an audio format such as Moving Picture Experts Group Audio Level 3 (MP3), Advanced Streaming Format (ASF), or WAV.

In yet further embodiments, content receiver 104 and content storage/player 106 comprise a single unit. For example, together content receiver 104 and content storage/player 106 may comprise a personal computer. The personal computer receives broadcast content, e.g., Internet radio over a packet-switched network. The personal computer may include software for identifying participating Internet radio stations and receive broadcast content in the form of distributed streaming audio. The computer may comprise a desktop, laptop, or other similar general-purpose computing device known in the art. The computer may include memory (e.g., removable storage media, hard disk drive) for storing information such as files, documents, images, audio, applications, and multimedia.

Also included in the exemplary system of FIG. 1 is a transaction server 110 and storage device 112. Transaction server 110 may communicate with content storage/player 106 via a network 108. Content storage/player 106 (or both of content receiver 104 and content storage/player 106 if they comprise a single unit) may communicate with transaction server 110 utilizing one or a combination of communications technologies including, e.g., satellite or cellular technology, wireless technologies, circuit-switched networking, and packet-switched networking, among others. In exemplary embodiments of the present invention, transaction server 110 operates as a database server and coordinates access to applications and data stored on the storage device 112.

The transaction server 110 depicted in the system of FIG. 1 may be implemented using one or more servers operating in response to a computer program stored in a storage medium accessible by the server 110. The transaction server 110 may operate as a network server (e.g., a web server) to communicate with requesting devices such as content storage/player 106. The transaction server 110 handles sending and receiving information to and from the content storage/player 106 and can perform associated tasks. The transaction server 110 may also include a firewall to prevent unauthorized access to the server and enforce any limitations on authorized access. For instance, an administrator may have access to the entire system and have authority to modify portions of the system. A firewall may be implemented using conventional hardware and/or software as is known in the art.

The transaction server 110 may also operate as an application server. The transaction server 110 executes one or more computer programs (i.e., an application for implementing the interactive content-based activities) to provide the functions described herein. Processing may be shared by the content storage/player 106 and the transaction server 110 by providing an application (e.g., java applet) to the content storage/player 106. Alternatively, the content storage/player 106 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The storage device 112 includes data relating to broadcast content, supplementary information such as broadcast sources and content identifiers, as well as associated activities and may be implemented using a variety of devices for storing electronic information. It is understood that the storage device 112 may be implemented using memory contained in the transaction server 110 or it may be a separate physical device. The storage device 112 is logically addressable as a consolidated data source across a distributed environment that includes network 108. Information stored in the storage device 112 may be retrieved and manipulated via the transaction server 110. In exemplary embodiments, storage device 112 stores tables of content identifiers and associated information for implementing the interactive content-based activities. Content identifiers are associated with specific broadcast content and are also mapped to specific activities. The activities are implemented in response to requests received via the corresponding content identifiers. The following table illustrates a sample table.

| Content_ID | BROADCAST | ACTIVITY |
|---|---|---|
| MU1000893 | Song | Download Song file |
| MU1006199 | Advertisement | Purchase concert tix |
| MU6974448 | Station promotion | Enter Contest |

Referring to the above table, a broadcast recipient hears a song that is received along with a corresponding content identifier "MU1000893". The recipient transmits a request to server 110 that includes the content identifier. The transaction server 110 maps the content identifier to the activity "Download Song file". The transaction server 110 then implements the request by enabling the recipient to download the song heard in the broadcast to the content storage/player 106. Details of this process are described further in FIG. 4.

As indicated above, the system of FIG. 1 also includes a network 108. The network 108 may be any type of known network including, but not limited to, a wide area network (WAN), a local area network (LAN), a global network (e.g. Internet), a virtual private network (VPN), and an intranet. The network 108 may be implemented using a wireless network or any kind of physical network implementation known in the art.

It will be understood that other types of content storage/players (e.g., digital cameras, personal video recorders, etc.) may also be utilized in implementing the interactive content-based activities. Accordingly, the content devices described above with respect to the system of FIG. 1 are provided for illustrative purposes and are not to be construed as limiting in scope.

Figure 2:
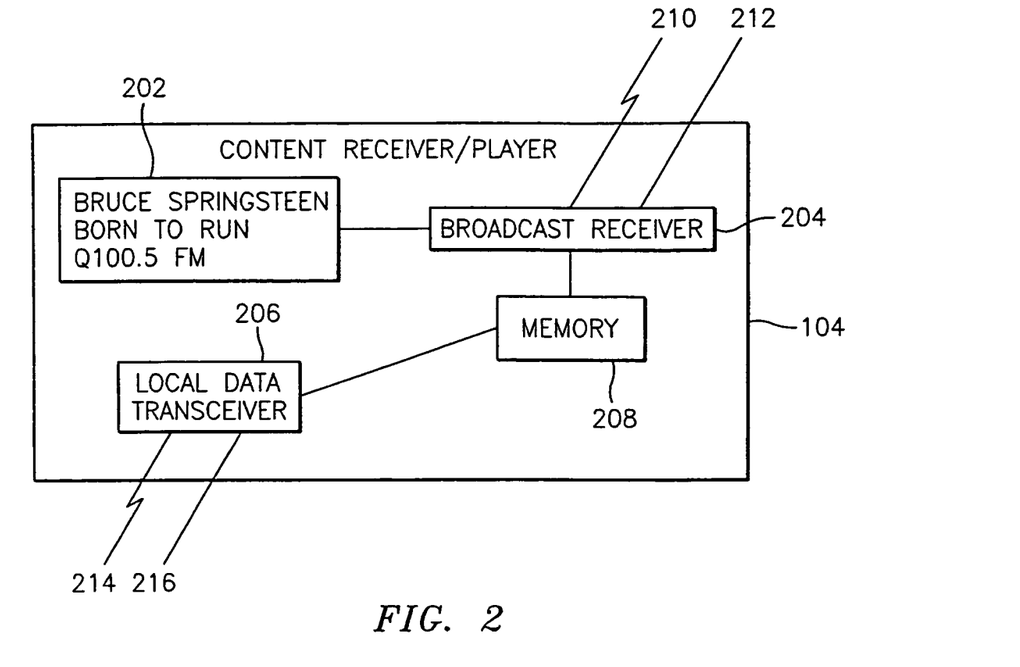
FIG. 2 is a block diagram of a content receiver and its components in exemplary embodiments.

Turning now to the block diagram of FIG. 2, an exemplary content receiver and its components will now be described. Content receiver 104 includes a display means 202 for presenting information (including supplementary information) relating to a broadcast to a recipient. A broadcast receiver 204 receives and translates broadcast signals, including the supplementary data, that are transmitted using over-the-air RF signaling means 210 or may be data signals (e.g., data packets) that are transmitted using, e.g., a packet-switched network 212. Broadcast receiver 204 then sends the translated supplemental data to the display means 202. As shown in the diagram of FIG. 2, supplementary information presented in display means 202 includes an artist name, song title, and station identification. Optionally, the content identifier of the current broadcast event may be displayed.

The content identifier of a current broadcast, as well as other supplementary information, may be stored in memory 208 residing within content receiver 104. Alternatively, a log of recently broadcast content identifiers may be stored in memory 208. Content receiver 104 also includes a local data transceiver 206 that communicates with content storage/player 106 via wireless means (e.g., short messaging service, Bluetooth ™, etc.) 214 or may communicate with content storage/player 106 via wireline means (e.g., USB cable) 216.

Figure 3:
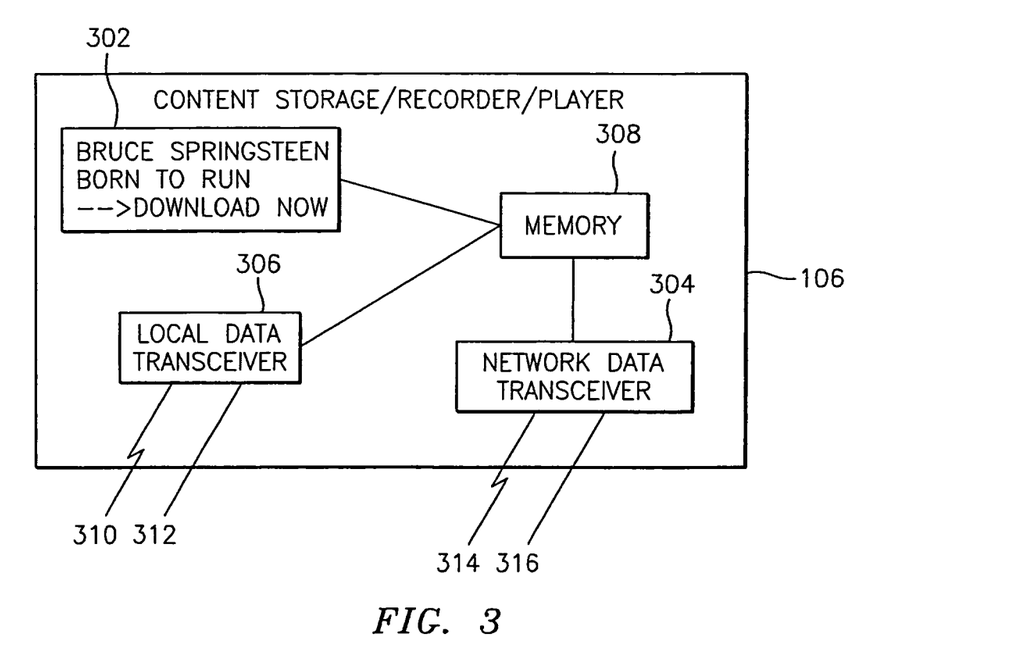
FIG. 3 is a block diagram of a content storage/player and its components in exemplary embodiments.

An exemplary diagram of a content storage/player will now be described with respect to FIG. 3. Content storage/player 106 includes a display means 302, a memory 308, a local data transceiver 306, and a network data transceiver 304. As described above, content storage/player 106 may communicate with content receiver 104 via wireless means (e.g., short messaging service, Bluetooth ™, etc.) 214 or may communicate with content receiver 104 via wireline means (e.g., USB cable) 216. This communication is facilitated by the local data transceiver 306 of content storage/player 106.

Memory 308 may store content in accordance with the type of content storage/player 106 being utilized (e.g., a digital music player storing audio content, a personal computer storing video, etc.). Memory 308 may also store an executable application for implementing the interactive content-based activities described herein. Memory 308 may communicate with display 302 when a recipient initiates a request via input controls on content storage/player 106. Network data transceiver 304 communicates with transaction server 110 over a wireless network 314 or wireline network 316 similar to those described above.

Figure 4:
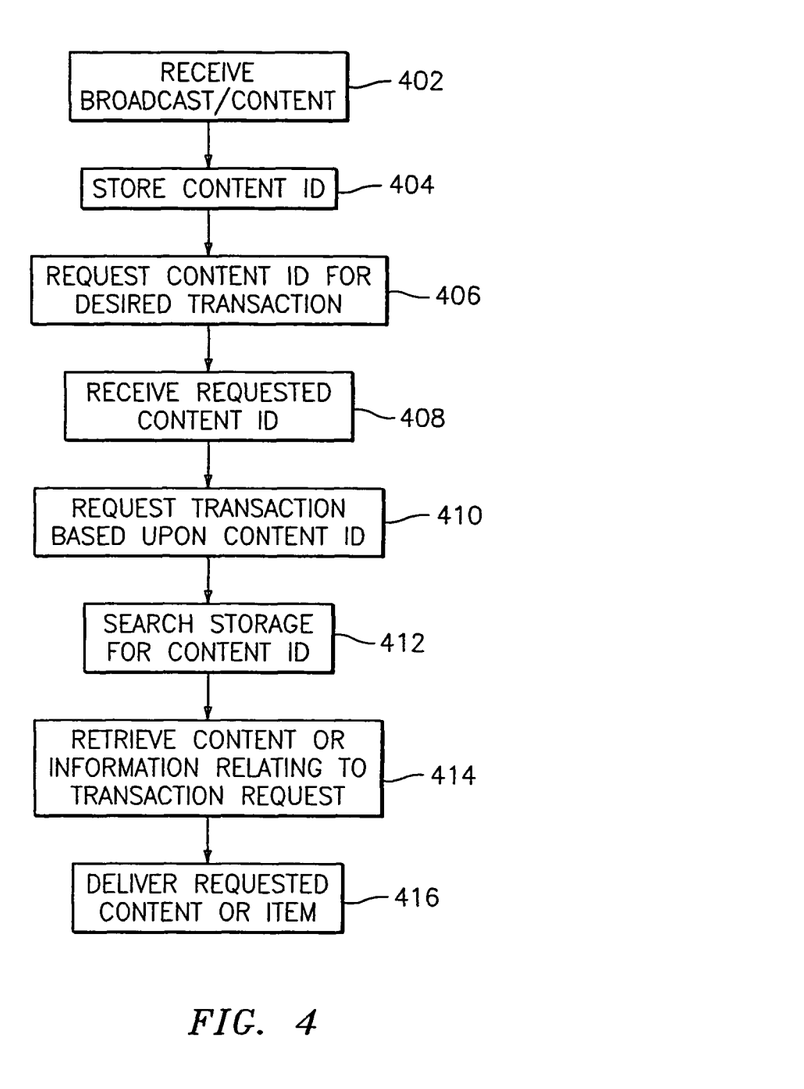
FIG. 4 is a flow diagram of a process for implementing the interactive content-based activities in exemplary embodiments.

An exemplary process for implementing the interactive content-based activities will now be described with respect to FIG. 4. For purposes of illustration, the processes described with respect to FIG. 4 refer to broadcast content consisting of music and the requested activity refers to a request to download a song file. However, it will be understood by those skilled in the art that any type of broadcast content and/or activity may be applied to the processes described herein.

At step 402, a broadcast is received by content receiver 104 from broadcast host system 102. In addition to the subject content (e.g., song), the broadcast content also includes supplementary information (e.g., the identification of the broadcast host system, the artist/composer/owner of the content, the title of the content, a content identifier that distinguishes the content from other broadcast items, etc.) via RDS/RBDS or other technologies. Content receiver 104 stores the content identifier at step 404 and may also store a log of recent broadcasts which includes one or more of the above associated supplemental information items. The content identifiers are each mapped to the broadcast and an activity and are stored in one or more tables in storage device 112.

When an individual is interested in an activity associated with a broadcast, the individual selects an option on the content storage/player 106 in order to obtain the corresponding content identifier at step 406. Upon selecting the option, the content storage/player 106 initiates a communication session with the content receiver 104 via communications means 214 or 216, requesting the current content identifier (if the broadcast is currently underway) or may optionally request the log from the memory 208 in content receiver 104. At step 408, the individual selects the desired content identifier from the log that is shown in the display 302 of content storage/player 106.

An option exists for the individual to then initiate a request associated with the content identifier. For example, a request option 310 "Download Now" is shown on display 302 for selection by a recipient. Upon selecting this option, the content storage/player 106 initiates a session over network 108 via communications means 314 or 316 and contacts transaction server 110 at step 410. Transaction server 110 performs a search of storage device 112 using the content identifier as a key at step 412. The activity or item mapped to the content identifier is retrieved at step 414. Transaction server 110 responds to the request in accordance with the requirements defined for the activity. By way of the example above, the recipient downloads the requested song.

Figure 5:
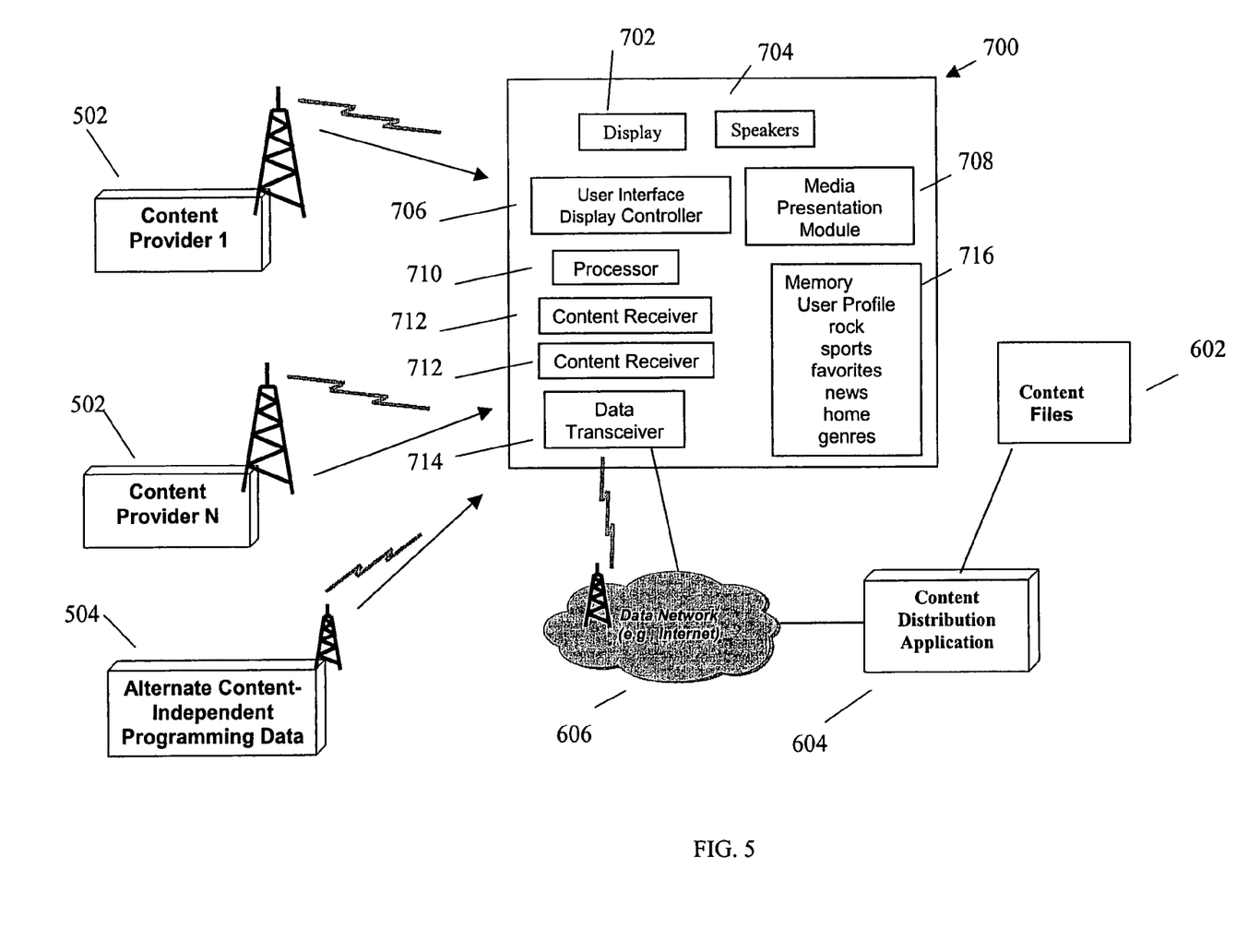
FIG. 5 is a block diagram of a system for distributing content in exemplary embodiments.

FIG. 5 is a block diagram of a system for distributing content in alternate exemplary embodiments. The system includes a wireless content management device 700 that receives, stores and plays content. The content management device 700 may be a mobile device which is used by a user in a car, on their person, etc. As described in further detail herein, the content management device 700 allows a user to receive content and enables numerous operations related to content storage, retrieval, purchase, etc.

Content providers 502 may represent existing sources for live content such as broadcast systems (AM, FM, satellite) with supplemental programming data (e.g., FM radio with Radio Data System (RDS)). The supplemental programming data may include a station identifier, artist, title, content identifier, begin/end timestamps, etc. Content-independent programming data source 504 provides guide programming data which may include station identifier, artist, title, content identifier, begin/end timestamps, etc. that is not associated with any one content provider 502 (e.g., similar to a listing of programming for television). Rather, the content-independent programming data source 504 provides guide programming data associated with a number of content providers. The supplemental programming data and guide programming data are used to generate a program guide as described in further detail herein.

A data network 606 communicates content data to the content management device 700. As described in further detail herein, the content data may include content files corresponding to the broadcast (e.g., mp3 songs, podcasts) or may be other types of data (e.g., graphics of album covers). The data network 606 may be any type of network such as a LAN, WAN, Internet, etc. accessed by the content management device 700 using wireless network standards (e.g., WiFi, 802.11). A content distribution application 604 is in communication with the data network 606. The content distribution application 604 may be implemented by a server executing a computer program for receiving requests for content data and delivering the content data, along with handling any associated billing for delivering the content data. Existing systems, such as the iTunes service, may serve as the content distribution application 606. A collection of content files 602 is stored on a database accessible by the content distribution application 604. When a user of the content management device 700 obtains content data, the content data is retrieved from the content files 602 by the content distribution application 604 and delivered to the content management device 700 over data network 606.

The content management device 700 includes a display 702 for displaying an interactive user interface to the user. The display 702 may be a touch screen that allows the display to receive inputs from the user. Alternatively, other user inputs may be provided on the content management device 700. The user interface is described in detail herein with reference to FIG. 7. Speakers 704 present content to the user and may be speakers internal to the content management device 700 or external speakers (e.g., automobile speakers). A media presentation module 708 is a user interface that allows the user to select different content for presentation, such as switching between broadcast radio stations and/or broadcast bands, CDs, mp3s, etc.

A user interface display controller 706 receives multiple feeds of programming data from content receivers 712 and/or data transceiver 714 as described herein. The programming data identifies current and future content that is available to the user. The user interface display controller 706 collects the programming data and formats it into the program guide presented on the display. The user interface display controller 706 also receives user inputs (e.g., from the display 702 if a touch screen) or other user input devices (e.g., radio buttons) and reformats the program guide in response to the user input or initiates other processes (e.g., acquiring content) in response to the user input.

A processor 710 executes an operating system for the content management device 700 and implements functions described herein. The processor 710 may be a general-purpose microprocessor executing computer program code stored in the content management device 700. Processor 710 communicates with the other components of the content management device 700 to coordinate processes described in further detail herein.

Content receivers 712 receive content from content providers 502. The content receivers may be AM/FM broadcast receivers, satellite receivers, etc. Additionally, the content receivers 712 may receive supplemental programming data communicated along with content from the content providers 502.

A data transceiver 714 receives guide programming data from the content-independent programming data source 504 and receives content data from data network 606. The data transceiver 714 may communicate with the content-independent programming data source 504 and data network 606 using known wireless network connectivity techniques (e.g., WiFi).

Memory 716 in the content management device 700 provides storage for content data and also stores user profile data.

The user profile data in memory 716 contains user-defined preferences for content to be selected by the content management device 700 and presented to the user. As described in detail herein, the user can specify content preferences in memory 716 which then directs the content receivers 712 to scan for content meeting those preferences.

Figure 6:
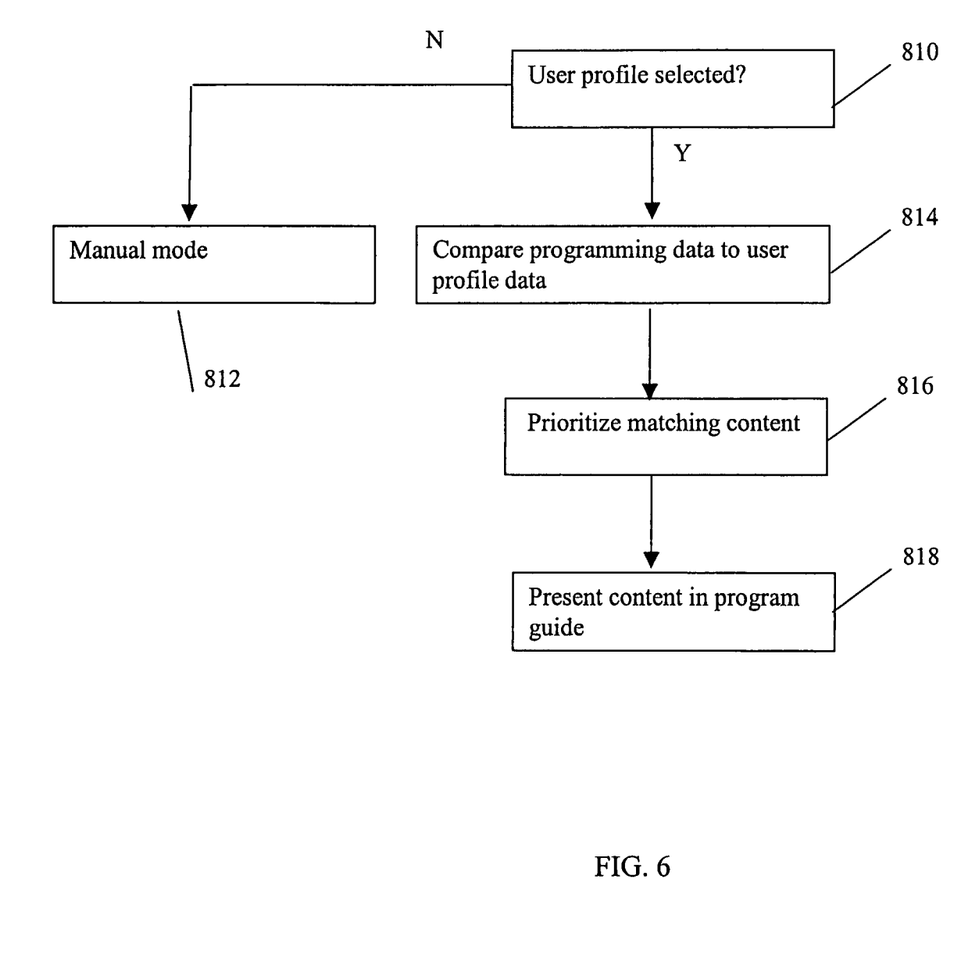
FIG. 6 flow diagram of a process for generating a program guide in exemplary embodiments.

Selection of content will now be described with reference to FIG. 6. FIG. 6 is a flowchart of a process for selecting content by the content management device 700. At step 810, the content management device 700 determines if the user has selected an entry from the user-profile data in memory 716. If not, the content management device 700 operates in a manual mode at step 812, similar to a conventional radio, in which the user can select content (e.g., broadcast radio stations) through known techniques (e.g., tune, scan, preset buttons).

If the content management device 700 is not in manual mode, the flow proceeds to step 814 wherein the processor 710 compares selected user-defined preferences to programming data provided by the content providers 502 and content-independent programming data source 504. For example, the user may select a user-defined preference for music in the rock genre. The processor 710 examines the available programming data to determine if any available content providers are playing music meeting the rock genre. The content receivers 712 may scan across multiple frequencies to identify multiple content providers 502 providing rock music.

Once the content providers 502 providing content matching the user-defined preference are identified, flow proceeds to step 816 where the content providers are prioritized based on one or more criteria. First, the signal strength of the received content may be used to prioritize content providers, where higher signal strength receives higher priority. Second, how well the programming data matches the user-defined preferences can be used to prioritize content providers.

Figure 7:
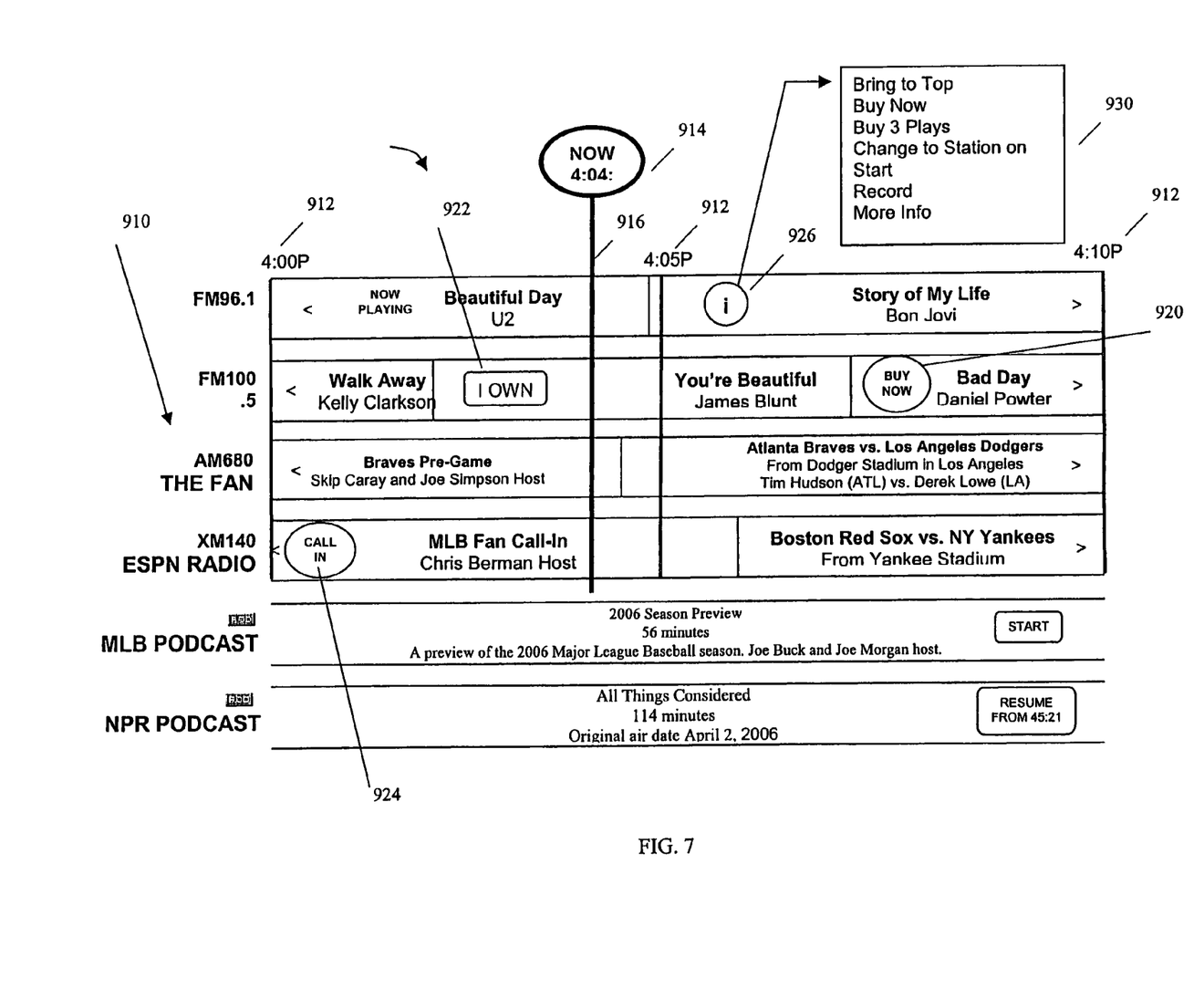
FIG. 7 illustrates a user interface in exemplary embodiments.

Once the content providers are prioritized, flow proceeds to step 818 where the content from the content providers 502 is presented as a program guide on a user display 702, in the prioritized order. FIG. 7 illustrates an exemplary user interface provided on display 702. As shown in FIG. 7, available content 910 is identified in a portion of the display. The available content includes content from content providers 502 and content stored in memory 716 (e.g., podcasts). For each available content 910, the current and future content is presented by title along a time axis including time indicators 912. A current time indicator 914 displays the current time and includes a line 916 perpendicular to the time axis. The user interface is built using programming data received from the content providers 502 and/or the content-independent programming data provider 504. The supplemental programming data received from the content providers 502 may include, at least, a station identifier, artist, title, content identifier (e.g., a unique identifier assigned to each content) and begin/end timestamps. The supplemental program data received from the content-independent programming data providers 504 may include similar information.

The content receivers 712 receive supplemental programming data from content providers 502 and data transceiver 714 receives the guide programming data from content-independent programming data provider 504. If there are inconsistencies between the two sources of programming data, supplemental programming data from the content providers 502 can override the guide programming data from the content-independent programming data provider 504. The streams of programming data are provided to the user interface display controller 706, which then formats the programming data into the program guide. As described above with reference to FIG. 6, the available content may be arranged in the program guide based on priority. Further, content stored in memory 716 may be presented on the program guide as content that is available for presentation to the user. For example, as shown in FIG. 6, the memory 716 includes two podcasts that the user may select for presentation.

The user can view current content and future content on the program guide and select content for presentation from the display 702, which may be a touch screen. It is understood that other user input devices may be used to select content from the program guide. A number of functions are enabled through the program guide of FIG. 6 as described herein. A buy now icon 920 is presented when content is available for purchase by the user. This functionality is described above with reference to FIGS. 1-4, and is not repeated.

For content that is already stored in memory 716, an owned icon 922 is presented adjacent the content title in the program guide. The user interface display controller 706 compares content identifiers from the supplemental program data to content identifiers for content stored in memory 716. If there is a match, this indicates that the user already has the content stored in memory 716. In this situation, the user interface display controller 706 superimposes the owned icon 922 on the content listing in the program guide. This alerts the user that they already own the content, so that they do not re-purchase the content unnecessarily.

Content from the content providers 502 may also be associated with a content provider allowing listeners to call the content provider (e.g., contests, voice an opinion). The supplemental programming data that accompanies content includes call-in information including a flag that call-in is permissible and a phone number for calling in. The user interface display controller 706 detects this supplemental programming information and generates a call-in icon 924. The user interface display controller 706 superimposes the call-in icon 924 on the content listing in the program guide.

If the user selects the call-in icon on the program guide (e.g., via a touchscreen or other input device) the processor 710 provides the call-in number to a communication device coupled to the content management device 700 to initiate the call. For example, the content management device 700 may provide the call-in number to an in-car wireless phone to initiate a call to the content provider 502 via a cellular network. Alternatively, the call may be a voice-over IP (VOIP) call-initiated through data transceiver 714. Further, the caller's voice may be converted to text to be used in a data text message over network 606 to a specified data address.

Content presented in the program guide may also be associated with additional action icon 926. The additional action icon 926 is presented whenever one or more additional actions are available with respect to the content. The additional actions may be enabled by the content management device 700 alone or may require interaction of the content management device 700 with external data sources. Upon selection of the additional action icon 926, the user interface display controller 706 generates a pop up menu 930 listing available additional actions. It is understood that not every additional action shown in FIG. 7 will be available for all content.

Menu 930 lists available actions that the user can select through the display 702 (e.g., touchscreen display) or another user input device. If the user selects "bring to top" from menu 930, the content identifier associated with the content is marked as a favorite and stored in memory 716. When the user interface display controller 706 presents subsequent program guide displays, it searches for matches with previously saved favorites in memory 716 and, if detected, presents the content higher or at the top of the program guide. The content designated as a favorite may optionally be highlighted with special visual effects in the program guide. The additional action icon 926 may also be used to cancel a favorite designation for content by deleting the content identifier from the favorites in memory 716.

Another action available through menu 930 is a buy now feature. As described above, this feature allows the user to purchase the content and download the content to memory 716. This functionality is described above with reference to FIGS. 1-4, and is not repeated.

Another option available through menu 930 is a "buy 3 plays" option, also referred to as a rent content option. Selection of the rent content option initiates downloading content in a manner similar to that described with respect to buying content. In the rent content scenario, however, the content is associated with a limited use license that limits the number of times the content can be played. The rented content file is stored in memory 716 along with a limited use indicator that marks the content file unavailable after a predefined number of plays. Likewise, this process can be used to renew a rental to buy more plays of the content. When renewing rented content, the limited use indicator associated with a content file in memory 716 is reset to allow additional playing of the content.

Another option available through menu 930 is a change to station on start action. Selection of this option for a selected content identifier results in the station identifier for the upcoming content to be saved along with the beginning timestamp of the upcoming selected content. For example, referring to FIG. 7, if Bad Day by Daniel Powter has been selected using this option, the station identifier of FM 100.5 is stored along with the time stamp indicating the beginning of the content, e.g., 4:08 pm. At the time indicated, the media presentation module 708 selects the station identifier specified for presentation of the content via the display 702 and speakers 704.

Another option available through menu 930 is a record action. Selection of the record option begins immediate or delayed recording of the selected content to local memory 716.

Another option available through menu 930 is a more information action. Selection of the more information action results in a visual presentation on the display 702 of additional information about the current content. The additional information may include items such as release date of a song, artist, record label, album cover artwork, etc. The additional information may already be associated with the content contained in supplemental programming data transmitted with the content or stored in memory 716. Alternatively, the additional information may be retrieved via data transceiver 714 via data network 606. The data transceiver 714 can send the content identifier to a source of content, such as content distribution application 604, to retrieve the additional information. The user interface display controller 706 then presents the additional information on display 702. Other forms of additional information include web related information. For example, during a broadcast of a sporting event, player statistics, box scores, gamecasts, etc. may be accessed via data network 606.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method implemented on a user mobile device, the method comprising:
   receiving, at the user mobile device, multiple feeds of content that are broadcast from a plurality of content providers, the user mobile device is a cellular telephone using cellular technology;
   receiving, at the user mobile device, supplemental programming data broadcast from the plurality of content providers;
   receiving, at the user mobile device, guide programming data broadcast from a content-independent programming data source;
   generating, by the user mobile device, an interactive program guide in response to the supplemental programming data and the guide programming data, the interactive program guide presenting the multiple feeds of content available to the user; and
   resolving, by the user mobile device, a conflict between the supplemental programming data from the plurality of content providers and the guide programming data from the content-independent programming data source by using the supplemental programming data from the plurality of content providers instead of the guide programming data from the content-independent programming data source to generate the interactive program guide.

2. The method of claim 1, wherein the multiple feeds of the content that are broadcast from the plurality of content providers to the user mobile device are separate from an internet connection to the user mobile device.

3. The method of claim 1 wherein receiving at the user mobile device the multiple feeds of the content from the plurality of content providers includes accessing user profile data, comparing the supplemental programming data to the user profile data, and altering a presentation of the interactive program guide based on matching characteristics between the user profile data and the supplemental programming data.

4. The method of claim 3 wherein the content is arranged in the interactive program guide in response to a degree of match between the user profile data and the supplemental programming data.

5. The method of claim 1 wherein the interactive program guide presenting the content available to the user includes presenting stored content stored on the user mobile device.

6. The method of claim 1 wherein if a content identifier of the content received from a content provider matches a content identifier of stored content stored on the user mobile device, associating an indication indicating that the stored content is already stored on the user mobile device with the content in the interactive program guide.

7. The method of claim 1 wherein the supplemental programming data from a content provider includes call-in information, and the generating the interactive program guide includes displaying a call-in availability indication associated with the content for which call-in is available.

8. The method of claim 7 further comprising initiating a call to the content provider providing the content for which call-in is available upon receipt of a user selection of the call-in availability indication.

9. The method of claim 1 further comprising presenting an additional action indicator associated with the content and initiating an additional action upon receipt of a user selection of the additional action indicator.

10. The method of claim 9 wherein the additional action includes marking the content as a favorite, and the generating the interactive program guide includes placing the content marked as the favorite at a preferred location in the interactive program guide.

11. The method of claim 9 wherein the additional action includes initiating a request for downloading the content to the user mobile device, wherein the request is for a limited number of plays of the content downloaded.

12. The method of claim 9 wherein the additional action includes selecting future content, storing a station identifier for the future content and a start time for the future content, and the user mobile device playing the future content when a current time matches the start time.

13. The method of claim 9 wherein the additional action includes recording the content as received on the user mobile device.

14. The method of claim 9 wherein the additional action includes a request for acquiring additional information related to the content upon user selection of the additional action indicator.

15. The method of claim 1 wherein the content includes content broadcast via radio.

16. A method implemented on a cellular telephone, the method comprising:
   receiving, at the cellular telephone, multiple feeds of content broadcast from a plurality of content providers, the cellular telephone being a user device;
   receiving, at the cellular telephone, programming data related to the content broadcast from the plurality of content providers;
   receiving, at the cellular telephone, guide programming data broadcast from a content-independent programming data source;
   generating, by the cellular telephone, an interactive program guide in response to the content and the programming data, the interactive program guide presenting the content available to the user;
   wherein if a content identifier of the content received from a content provider matches a content identifier of stored content stored on the cellular telephone, an indicator indicating that the stored content already stored on the cellular telephone is associated with the content in the interactive program guide;
   resolving, by the cellular telephone, a conflict between the supplemental programming data from the plurality of content providers and the guide programming data from the content-independent programming data source by using the supplemental programming data from the plurality of content providers instead of the guide programming data from the content-independent programming data source to generate the interactive program guide;
   wherein audio of the content plays through vehicle speakers in a vehicle.

17. An apparatus for a user mobile device in a vehicle, the apparatus comprising:
   a content receiver in the mobile device receives content broadcast from a plurality of content providers and receives supplemental programming data broadcast from the plurality of content providers, wherein the user mobile device is a cellular telephone using cellular technology;
   a data transceiver in the mobile device receives guide programming data broadcast from a content-independent programming data source;
   a user interface display controller in the mobile device generates an interactive program guide in response to the supplemental programming data and the guide programming data, the interactive program guide presenting the content available to the user;
   a display device coupled to the user interface display controller displays the interactive program guide;
   wherein in response to receiving a selection of a favorite designation for the content displayed in the interactive program guide, the display device highlights the content having the favorite designation with special visual effects in subsequent presentations in the interactive program guide; and
   wherein the data transceiver resolves a conflict between the supplemental programming data from the content provider and the guide programming data from the content-independent programming data source by using the supplemental programming data from the content provider instead of the guide programming data from the content-independent programming data source to generate the interactive program guide.

* * * * *